Figure 1:
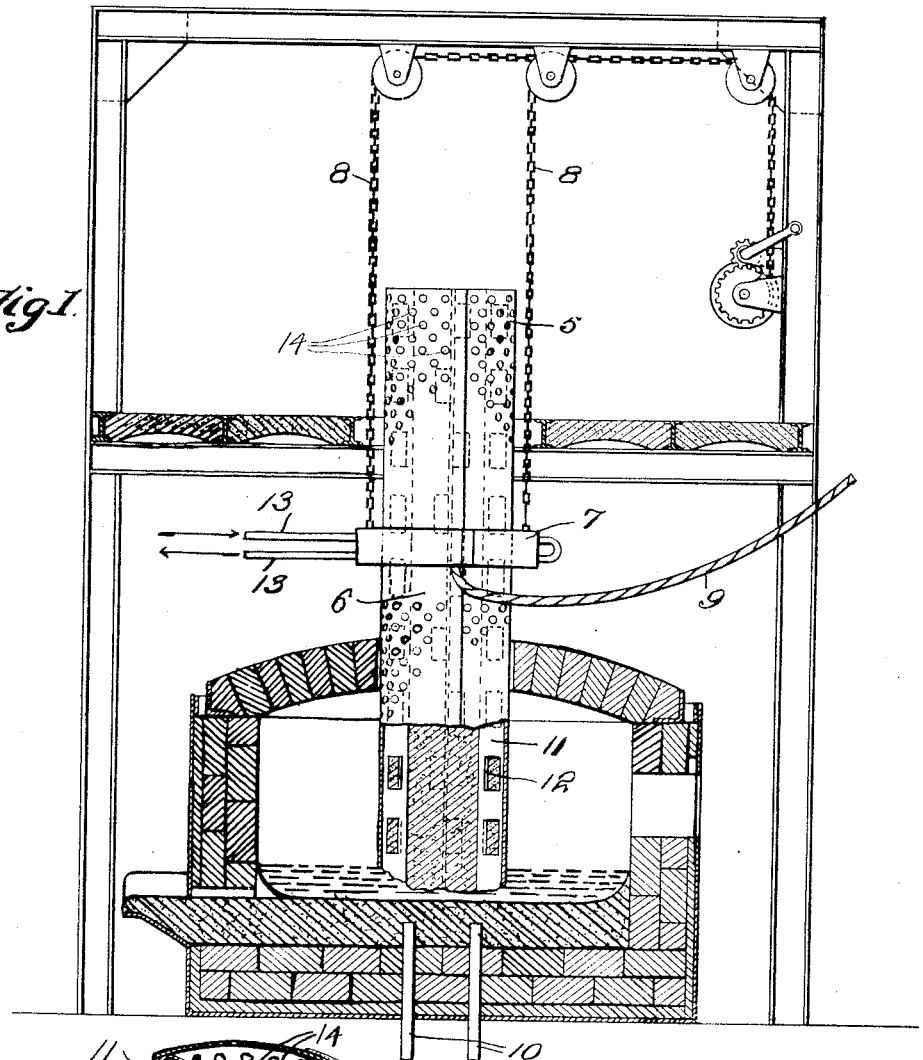

Inventor
Carl Wilhelm Söderberg

Patented Jan. 2, 1923.

1,440,724

UNITED STATES PATENT OFFICE.

CARL WILHELM SÖDERBERG, OF CHRISTIANIA, NORWAY, ASSIGNOR TO DET NORSKE AKTIESELSKAB FOR ELEKTROKEMISK INDUSTRI, OF CHRISTIANIA, NORWAY.

ELECTRODE FOR ELECTRIC FURNACES AND PROCESS FOR MANUFACTURING THE SAME.

Application filed September 8, 1919. Serial No. 322,480.

*To all whom it may concern:*

Be it known that I, CARL WILHELM SÖDERBERG, a subject of Norway, and a resident of the city of Christiania, Kingdom of Norway, have invented certain new and useful Improvements in the Electrodes for Electric Furnaces and Processes of Manufacturing the Same, of which the following is a specification.

This invention relates to electrodes for electric furnaces and the object of the invention is an improved electrode, and a method whereby the same may be produced in a simple and economical manner.

Electrodes for the purpose above mentioned are generally made from some carbonaceous material, such as coal, graphite, etc. The material or materials selected are reduced to the desired fineness and mixed with a suitable binder, such as tar or pitch. The mixture is then moulded to the desired form and baked in a furnace until the volatile matter is driven off, and the electrode has the desired density and conductivity.

In a prior U. S. patent application (Serial Number 205,416 filed December 4, 1917) I have disclosed a method for manufacturing electrodes whereby the raw electrode mass is tamped or moulded around one or more iron bars, and subsequently baked by heat electrically generated in the iron bars together with the heat from the electric furnace in which the electrode is used. My present invention is a modification of the process described in the above application, although the broad features thereof are present herein.

According to my present method electrodes are manufactured by tamping or pressing a suitable electrode mass into a metallic mantle. The mantle serves as a mould and protects the electrode from oxidation during the heating process. By employing a metallic mantle—preferably of iron—a further advantage is gained in that such a mantle can carry up to 4 amperes per square millimeter without excessive heating, while an iron rod or core can carry only 1.5–2 amperes per square millimeter. This may be explained by the well known fact that an electric current will be distributed very irregularly in an iron rod. In the centre of the rod the current density will be small, while near its exterior surface it will be great.

The raw electrode made in accordance with my process may be baked to a comparatively low temperature, for instance 600–800° C. before it is mounted in the electric furnace in which it is to be used. I prefer, however, to carry out the entire baking process in the electric furnace and to produce the electrode continuously by adding sections of the mantle and tamping in raw electrode mass when necessary as the electrode is consumed.

Where the electrode is wholly produced in the furnace in which it is employed, the baking of the electrode is effected in part by the heat electrically generated in the electrode itself and in part by the heat from the melting crater. Current is supplied to the electrode and to the furnace initially through the mantle and as the raw electrode material becomes baked and its conductivity increased it carries current and the electrode eventually operates like a prebaked electrode. The electrode comprising the electrode mass and the enclosing mantle is fed into the furnace as its lower or operating end is consumed. The mantle in the preferred form serves not only as a conductor and as a protection for the electrode mass but also as a mechanical means of retaining and supporting the same.

In certain character of work and of electrode furnace a difference in the coefficients of expansion of the mantle and electrode mass becomes a factor which must be provided for and this invention contemplates such provision where necessary.

The preferred type of electrode is shown diagrammatically in the accompanying drawings which form a part of this application but which it is to be understood are for illustrative purposes only, and no undue limitation is to be deduced therefrom. In these drawings Fig. 1 is a vertical cross section of an electric furnace, employed in certain metallurgical processes, with the electrode mounted for manufacture and operation therein, the electrode being broken away; and Fig. 2 is a perspective of a section of the metallic mantle.

The electrode 5 comprises a metallic mantle 6 filled with carbonaceous material.

It is supported in the furnace by an electrode holder 7 by means of a chain lift 8 so that its position in the furnace may be regulated. Current is supplied to the holder, and thence to the electrode, by means of a flexible conductor 9. The return circuit is illustrated as made through the lower electrode or conductor 10.

Figure 2:
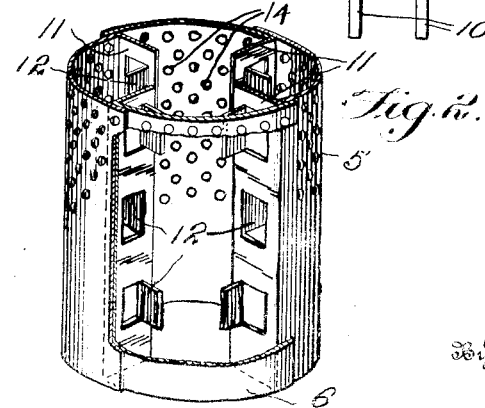

The mantle 6 is built up of sections, such as illustrated in Fig. 2, suitably fastened together. It is made with internally extending ribs 11 which are provided with projections 12. These ribs and projections afford means of distributing current in the carbonaceous material and act as a mechanical support therefor to prevent slipping of the carbonaceous material in the mantle. The support thus afforded is sufficiently elastic to provide for the difference in expansion between the mantle and the carbonaceous material. This factor is also taken care of in part by water-jacketing the electrode holder 7, water pipes 13 being supplied for this purpose. The mantle 6 is further preferably perforated as at 14 so that gases produced by the baking may escape without deforming the mantle.

The mantle is made of sheet metal, usually of sheet iron. I have found that for an electrode having a diameter of 600 millimeters and carrying an electric current of 15,000 amperes, a mantle made of sheet iron 1 to 1.3 millimeters in thickness gives satisfactory results.

In the production of the electrode the carbonaceous material, mixed with a suitable binder such as tar or pitch, is tamped or pressed into the mantle, which conveniently extends into what is commonly called a tamping house located above the furnace and so far as practical heat insulated therefrom. In starting the electrode it is preferable to place a layer of conductive material such as coke in the furnace at the bottom of the electrode. This serves as a suitable resistance between the electrode and its return circuit during the preliminary heating of the furnace and electrode. The current is then applied, and the baking of the electrode is started by the heat electrically generated in the mantle and its ribs and by the heat developed in the coke. The lower end of the electrode soon becomes baked and the temperature of the furnace rises. When the furnace has reached the desired working temperature the charge is added gradually. As the temperature of the furnace increases, baking of the electrode progresses, due in part to the heat from the melting crater, and extends upwardly in the electrode to a distance depending upon the temperature of the furnace and other local conditions.

In producing the electrode continuously in the furnace in which it is employed, sections of the mantle are suitably fastened to the top of the mantle of the electrode as by welding or riveting and are filled with fresh electrode mass in the tamping house. The electrode holder is moved upwardly on the mantle of the electrode as is necessary and the baking continues as above described.

As above indicated if desired the electrode may be partially baked before it is placed in the electric furnace in which it is to be used, the comparatively low temperatures of 600° to 700° C. above stated being employed. The partially baked electrode mass will then be sufficiently strong to withstand the elongation of the mantle which takes place when the electrode is subjected to the higher temperatures of the electric furnace. This prior baking thus takes care of the difference in expansion between the mantle and the carbonaceous matrial without the use of the elastic contact between the two described in connection with the preferred form of this invention.

This same result may be also accomplished when the electrode is produced in the furnace in which it is to be employed, by providing sufficient cooling to keep the mantle at a comparatively low temperature until the electrode mass has become sufficiently baked. In the latter case the lower part of the electrode and the mantle surrounding it will become very hot, but as the electrode at this point is hard the expansion of the mantle will have no serious effect upon it.

The foregoing detailed description has been given for clearness of understanding and no undue limitation should be deduced therefrom, but the appended claims should be construed as broadly as permissible in view of the prior art.

What I claim as new and desire to secure by Letters Patent of the United States is:

1. The process of forming an electrode which comprises building the electrode up at one end in sections and applying heat, each section comprising an enclosing metallic mantle and electrode mass.

2. In the manufacture of electrodes for electric furnaces the process which comprises tamping raw electrode mass into a metallic mantle which constitutes a part of the electrode and which is provided with projections extending into the electrode mass, and passing electric current through the mantle whereby heat is generated and distributed into the interior of the electrode mass and baking of the latter thus effected.

3. In the manufacture of electrodes for electric furnaces the process which comprises tamping raw electrode mass into a metallic mantle which constitutes a part of the electrode and which is provided with projections extending into the electrode mass, and passing electric current through the mantle whereby heat is generated and distributed along the bordering surface and into the interior of the electrode mass and baking of the latter thus effected.

4. In the manufacture of electric furnace electrodes the process which comprises tamping raw electrode mass into a metallic mantle which constitutes a part of the electrode and heating the mass to a comparatively low temperature whereby the mass becomes sufficiently hard to withstand the tension caused by the expansion of the metallic mantle at the comparatively high temperatures subsequently employed.

5. In the manufacture of electric furnace electrodes the process which comprises tamping raw electrode mass into a metallic mantle which constitutes a part of the electrode, placing the mantle and electrode mass in an electric furnace and leading an electric current through the mantle and electrode mass, thereby baking the raw electrode mass within the metallic mantle.

6. In the manufacture of electric furnace electrodes the process which comprises tamping raw electrode mass into a metallic mantle placed in an electric furnace which mantle constitutes a part of the electrode and leading an electric current through the metallic mantle, thereby first baking the part of the raw electrode mass nearest the melting crater of the electric furnace by means of heat generated in said melting crater and also in the metallic mantle, and completing the baking of the electrode mass partly by heat generated in the metallic mantle and partly conducted from the baked electrode mass near the melting crater.

7. In the manufacture of electric furnace electrodes the process which comprises tamping raw electrode mass into a metallic mantle placed in an electric furnace which mantle constitutes a part of the electrode and leading an electric current through the metallic mantle, thereby first baking the part of the raw electrode mass nearest the melting crater of the electric furnace by means of heat generated in said melting crater and also in the metallic mantle, completing the baking of the raw electrode mass partly by heat generated in the metallic mantle and partly conducted from the baked electrode mass near the melting crater, placing a new section of metallic mantle on the top of the electrode and tamping raw electrode mass thereinto, thus continuously making the electrode in the electric furnace in which it is used.

8. An electric furnace electrode comprising a carbonaceous portion and an enclosing metallic mantle, the carbonaceous portion of the electrode being baked at one end of the electrode and unbaked at the other.

9. An electric furnace electrode comprising electrode mass and an enclosing mantle, and means for elastically connecting the mass and the mantle.

10. An electric furnace electrode comprising electrode mass and an enclosing mantle, the mantle being provided with projections extending into the electrode mass.

11. An electric furnace electrode comprising a continuous core of electrode mass and an enclosing mantle in sections, the core being renewable at one end without break in the continuity thereof.

12. As a new and useful article of manufacture an electrode for electric furnaces comprising a metallic mantle and electrode mass tamped thereinto said mantle being provided with ribs penetrating into the electrode mass and securing an intimate electrical and mechanical contact between mantle and electrode mass.

13. As a new and useful article of manufacture an electrode for electric furnaces comprising a metallic mantle and electrode mass tamped thereinto, said mantle being provided with ribs and said ribs being provided with projections, the ribs penetrating into the electrode mass and securing an intimate electrical and mechanical contact between mantle and electrode mass.

14. As a new and useful article of manufacture an electrode for electric furnaces comprising a metallic mantle provided with holes and electrode mass tamped into said mantle.

15. As a new and useful article of manufacture an electrode for electric furnaces comprising a metallic mantle provided with holes and electrode mass tamped into said mantle, the mantle having ribs penetrating into the electrode mass and thereby securing an intimate electrical and mechanical contact between the mantle and electrode mass.

16. As a new and useful article of manufacture an electrode for electric furnaces comprising a metallic mantle provided with holes and electrode mass tamped into said mantle, the mantle having ribs penetrating into the electrode mass and thereby securing an intimate electrical and mechanical contact between the mantle and electrode mass, said ribs being provided with projections.

Signed at Christiania, Norway, this 15th day of July, 1919.

CARL WILHELM SÖDERBERG.